R. H. MOORE.
SCRAPER FOR SUGAR CENTRIFUGALS.
APPLICATION FILED MAR. 20, 1911.

1,042,710.

Patented Oct. 29, 1912.

Witnesses

Inventor
Ralph H. Moore

UNITED STATES PATENT OFFICE.

RALPH H. MOORE, OF SPRECKELS, CALIFORNIA, ASSIGNOR TO SPRECKELS SUGAR COMPANY, OF SAN FRANCISCO, CALIFORNIA, A CORPORATION OF CALIFORNIA.

SCRAPER FOR SUGAR-CENTRIFUGALS.

1,042,710.  Specification of Letters Patent.  Patented Oct. 29, 1912.

Application filed March 20, 1911. Serial No. 615,773.

*To all whom it may concern:*

Be it known that I, RALPH H. MOORE, a citizen of the United States, residing at Spreckels, in the county of Monterey and State of California, have invented certain new and useful Improvements in Scrapers for Sugar-Centrifugals, of which the following is a specification.

The hereinafter described invention relates to a tool for removing or breaking down the sugar accumulation or cake from the filtering or straining wall of sugar centrifugals while in motion; the object of the invention being the production of a simple, durable, effective, and inexpensive tool for the successful accomplishment of the desired object to be attained without causing the work of the centrifugals to be interfered with by the stopping thereof in order to break down the accumulated cake of sugar on the interior straining wall thereof. Under the practice existing in this section of the country at the present time for breaking down the accumulated cake the centrifugal is brought to a stop as to its working, and the operator then scrapes off the cake of sugar from the surface of the straining wall by means of hand paddles. The loss of time thus occasioned in the working of the machine amounts to considerable in the course of twenty-four hours, and especially so to the sugar plant where a number of such machines are employed, which loss is saved by the use of the present invention, inasmuch as the same is placed into action during the working operation of the centrifugal.

Figure 1:
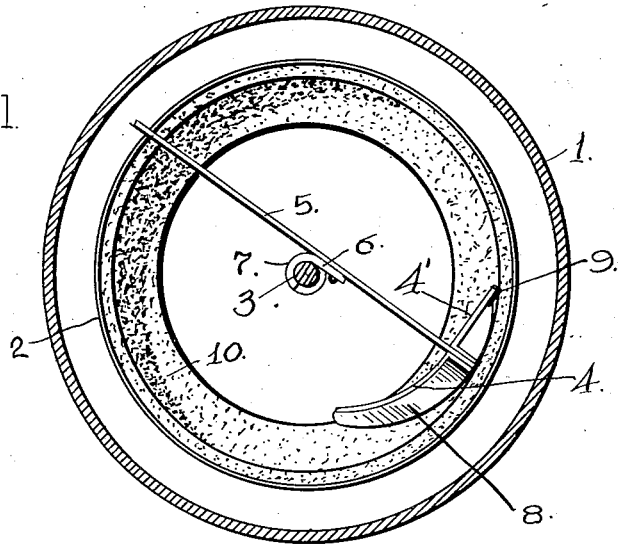
Figure 2:
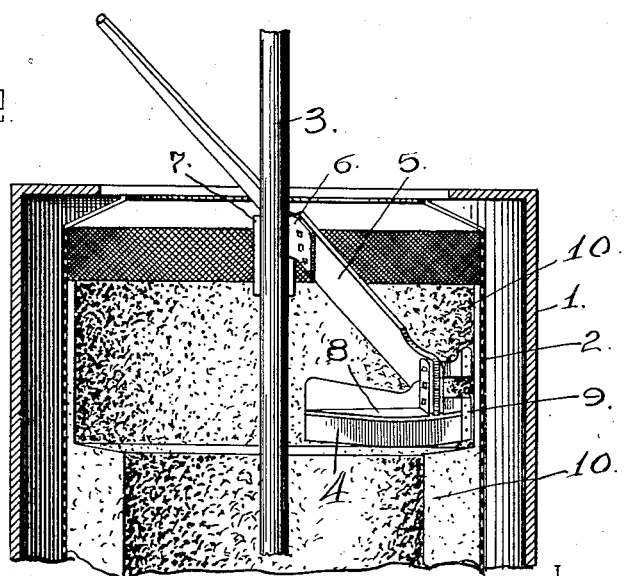

To comprehend the invention reference should be had to the accompanying sheet of drawings wherein—
Figure 1 is a plan view of a centrifugal with the improved scraping tool applied thereto. Fig. 2 is a broken sectional view of the centrifugal illustrating the application of the scraping tool.
In the drawings, the numeral 1 is used to indicate the outer shell of the sugar centrifugal, 2 the circular meshed screen or strainer wall within the outer shell, and 3 the central drive shaft for the centrifugal.
The scraping tool comprises preferably an aluminum or other metal shoe casting 4, attached to the inner end of an operating handle or lever 5 to stand in a substantially vertical plane with respect thereto, the said handle or lever being extended therefrom at a suitable inclination. To the said handle or lever 5, approximately mid-way of its length, is attached an angular extension 6 of a depending segmental guide bearing shield 7, which, when the scraper tool is applied to the centrifugal, partly embraces the drive shaft 3 and acts as a slidable bearing for the handle or lever 5, and serves to hold the same firmly against the central shaft. The shoe casting 4 is slightly curved and is reinforced by a strengthening rib 8, and to the outer end of said casting is detachably connected a scraper blade 9, preferably composed of wood, the said blade by reason of the curve of the shoe casting being projected in advance of the lower end of the lever arm. By mounting the scraper or cutting blade 9 detachably within the shoe casting 4, the same may be readily removed when worn beyond the point of effectiveness and renewed from time to time by being replaced by a new one. When the tool is held in working position, the exposed edge of the scraper or cutting blade stands parallel to the vertical face of the filtering or straining wall 2 of the centrifugal, Fig. 2 of the drawings.

The centrifugals in general use in connection with sugar works are approximately forty inches in diameter, the upper rim thereof standing about thirty inches from the floor, and they are driven at substantially one thousand revolutions per minute. The crude sugar is poured into the machine within the inner circular screen wall 2 in any suitable manner, generally from a spout arranged alongside the machine. During the working operation of the centrifugal the centrifugal strains generated casts the crude sugar, which is in a fluid-like or syrup condition, up against the screen wall 2, on the inside of and spaced from the outer shell 1, and forces the molasses in the sugar through the same, leaving the white or bleached sugar firmly embedded against the inside of the screen wall 2, forming thereon a cake 10 to the thickness of several inches, which cake must be broken down in order to allow for the proper separation of the molasses from the sugar.

The described scraper tool is operated for breaking down the accumulated cake 10 to free the surface screen wall 2 during the operation of the centrifugal as follows:—
The operator inserts the tool within the centrifugal until the downwardly extended bearing shield 7 rests against the rotating central shaft 3, when the cutting edge of the cutting blade 9 will be closed up against the face of the revolving screen 2, and in engagement with the upper edge of the cake 10, carried by the screen of the highly rotating centrifugal. During the rotation of the centrifugal the blade 9 gradually cuts away or breaks down the cake 10, the released sugar falling to the bottom of the centrifugal and passing out through an outlet opening therein. Inasmuch as the cutting blade 9 is only about one foot in length, it is required that the same be moved up and down within the centrifugal in order to cover the entire surface of the cake clinging to the inner wall surface of the circular screen 2, and this movement is accomplished by the operator exerting an upward and downward pressure on the handle or lever 5, the same being guided during such movements by the guide bearing shield 7 acting against the surface of the rotating central shaft 3. Under the construction of the scraper tool, all strains generated by the same while in use fall onto the central drive shaft, the operator being relieved thereof.

By means of the described tool the accumulated sugar cake is broken down without in any manner interfering with the working of the centrifugal and without loss of time to the sugar factory.

The described device is simple of construction, inexpensive as to manufacture, and quickly and easily attached to and removed from the drive shaft of the centrifugal.

By reason of the curved shape of the shoe 4, and its projection below and at each side of the lever arm 5, the sugar as cut away from the inner wall surface of the circular screen 2 is guided toward the central portion of the centrifgual, the extension 4' thereof serving as a deflecting wall for directing the same away from the surface of the said screen 2.

I do not wish to be understood as confining myself to the particular details of construction shown and described, for obviously these may be varied without departing from the invention which broadly resides in the application of a scraper tool adapted to be vertically moved within the centrifugal with respect to the inner wall surface of the circular screen during the operation of and without interference with the action of the centrifugal.

Having thus described the invention what is claimed as new and desired to be protected by Letters Patent is—

1. A scraper for centrifugal machines, the same comprising a handle, a scraper blade carried at one end arranged at an angle thereto, and a bearing guide shield secured to and depending from the said handle intermediate the ends thereof, for detachable engagement with a rotary drive shaft.

2. A scraper for centrifugal machines, the same comprising a handle, a shoe casting carried at one end thereof, a scraper blade detachably secured to said casting, and a bearing guide shield secured to and depending from the handle intermediate the ends thereof for detachable engagement with a rotary drive shaft.

3. A scraper for centrifugal machines, the same comprising a handle, a shoe casting of curved form secured to one end thereof to project beyond and at each side of the handle, a cutting blade detachably mounted at the outer edge of said shoe, and a bearing guide shield secured to and depending from the lever arm intermediate the ends thereof for detachable engagement with a rotary drive shaft.

In testimony whereof I have signed my name to this specification in the presence of two subscribing witnesses.

RALPH H. MOORE.

Witnesses:
B. S. JOHNSON,
L. L. MANN.